United States Patent
Silva et al.

(10) Patent No.: US 12,061,823 B2
(45) Date of Patent: Aug. 13, 2024

(54) SYSTEM AND METHOD FOR EXCHANGING AND PREFLIGHTING DOCUMENTS FOR PRINTING AND PUBLISHING

(71) Applicant: ESKO Software BV, Ghent (BE)

(72) Inventors: Joana Silva, Ghent (BE); Wim Jan C. Fransen, Bornem (BE); Liesbet Olbrechts, Elsegem (BE)

(73) Assignee: Esko Software BV, Ghent (BE)

( * ) Notice: Subject to any disclaimer, the term of this patent is extended or adjusted under 35 U.S.C. 154(b) by 0 days.

(21) Appl. No.: 18/281,140

(22) PCT Filed: Mar. 8, 2022

(86) PCT No.: PCT/EP2022/055867
§ 371 (c)(1),
(2) Date: Sep. 8, 2023

(87) PCT Pub. No.: WO2022/189418
PCT Pub. Date: Sep. 15, 2022

(65) Prior Publication Data
US 2024/0152298 A1 May 9, 2024

Related U.S. Application Data

(60) Provisional application No. 63/158,637, filed on Mar. 9, 2021.

(51) Int. Cl.
*G06F 3/12* (2006.01)
(52) U.S. Cl.
CPC .......... *G06F 3/1204* (2013.01); *G06F 3/1256* (2013.01); *G06F 3/1208* (2013.01)
(58) Field of Classification Search
USPC .............................. 358/1.13, 1, 15
See application file for complete search history.

(56) References Cited

U.S. PATENT DOCUMENTS 7,327,481 B2   2/2008   Such et al.
7,349,116 B2   3/2008   Wiechers
(Continued)

FOREIGN PATENT DOCUMENTS

EP    1 262 748 A2    4/2002
EP    1 546 917 B1    11/2015
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Jul. 6, 2022, by the European Patent Office in corresponding International Application No. PCT/EP2022/055867. (13 pages).

*Primary Examiner* — Haris Sabah
(74) *Attorney, Agent, or Firm* — Buchanan Ingersoll & Rooney PC

(57) ABSTRACT

A method for enabling a customer service representative (CSR) to review a print job including a digital graphics file for printing. The CSR receives an incoming electronic communication containing job instructions with the file attached, selects a job instruction preset from the user interface, and initiates preflighting of the file based upon the presets and the printing system. The user interface includes a display screen having a plurality of areas displaying information about the graphics file and annotations relating to results of the preflighting operation, a page of the job, selectable thumbnail images for the job pages, and selectable presets. If preflighting identifies problems, a prepopulated outgoing electronic communication communicating the problems is created and sent to the customer. If no problems are identified, the job instructions and digital graphics file are saved, and an automatic notification is sent to a prepress operation address indicating the job is ready.

19 Claims, 14 Drawing Sheets

(56) References Cited

U.S. PATENT DOCUMENTS

| | | |
|---|---|---|
| 7,525,678 B2 | 4/2009 | Wiechers et al. |
| 7,570,376 B2 | 8/2009 | Wiechers |
| 7,570,379 B2 | 8/2009 | Wiechers et al. |
| 7,757,169 B2 | 7/2010 | Aizikowitz et al. |
| 7,783,972 B2 | 8/2010 | Camps et al. |
| 8,407,102 B2 | 3/2013 | Field et al. |
| 8,503,007 B2 | 8/2013 | Steux et al. |
| 8,649,044 B2 | 2/2014 | Giannetti et al. |
| 8,687,221 B1 | 4/2014 | Bergmans et al. |
| 8,928,935 B2 | 1/2015 | Such et al. |
| 8,994,987 B2 | 3/2015 | Graf et al. |
| 9,049,405 B2 | 6/2015 | Tastl et al. |
| 9,298,796 B2 | 3/2016 | Ostler et al. |
| 9,549,069 B2 | 1/2017 | McBrearty et al. |
| 9,619,533 B2 | 4/2017 | Stone et al. |
| 9,766,847 B1 * | 9/2017 | Alacar ................. G06F 3/1224 |
| 9,842,116 B2 | 12/2017 | Pimprikar et al. |
| 9,891,871 B2 | 2/2018 | Nakatani |
| 10,108,311 B2 | 10/2018 | Gassner et al. |
| 10,180,956 B2 | 1/2019 | Allwardt et al. |
| 10,204,088 B2 | 2/2019 | Bezar et al. |
| 10,375,132 B2 | 8/2019 | Sosna et al. |
| 10,419,566 B2 | 9/2019 | Sosna et al. |
| 10,425,406 B2 | 9/2019 | Douglas-Middleton et al. |
| 10,452,518 B2 | 10/2019 | Gassner et al. |
| 10,467,629 B2 | 11/2019 | Kallman et al. |
| 2003/0179407 A1 | 9/2003 | Herr |
| 2005/0030578 A1 | 2/2005 | Wiechers |
| 2005/0034022 A1 | 2/2005 | Wiechers et al. |
| 2005/0034030 A1 | 2/2005 | Wiechers |
| 2005/0043842 A1 | 2/2005 | Wiechers |
| 2005/0043844 A1 | 2/2005 | Wiechers et al. |
| 2005/0043845 A1 | 2/2005 | Wiechers |
| 2005/0043846 A1 | 2/2005 | Wiechers |
| 2005/0043847 A1 | 2/2005 | Wiechers |
| 2005/0043848 A1 | 2/2005 | Wiechers |
| 2006/0004638 A1 | 1/2006 | Royal et al. |
| 2007/0049302 A1 * | 3/2007 | Mickeleit ............... G06Q 10/10 455/466 |
| 2009/0031216 A1 | 1/2009 | Dressel et al. |
| 2017/0132637 A1 | 5/2017 | Kallman et al. |
| 2017/0212964 A1 | 7/2017 | D'anna et al. |
| 2017/0286982 A1 | 10/2017 | Howard et al. |
| 2017/0316159 A1 | 11/2017 | Hooker et al. |
| 2017/0318120 A1 | 11/2017 | Tong et al. |
| 2018/0218121 A1 | 8/2018 | Gassner et al. |
| 2018/0307685 A1 | 10/2018 | Sa et al. |
| 2018/0367703 A1 * | 12/2018 | Wagatsuma ......... H04N 1/6033 |
| 2019/0050871 A1 | 2/2019 | Sosna et al. |
| 2019/0122225 A1 | 4/2019 | Sosna et al. |
| 2019/0147183 A1 | 5/2019 | Gassner et al. |
| 2019/0164026 A1 * | 5/2019 | Masuda ................ G06F 3/1212 |
| 2019/0171746 A1 | 6/2019 | Sosna et al. |
| 2019/0199724 A1 | 6/2019 | Kallman et al. |
| 2019/0235992 A1 | 8/2019 | Batzdorff et al. |
| 2019/0236526 A1 | 8/2019 | Sosna |
| 2019/0238551 A1 | 8/2019 | Gassner et al. |
| 2019/0364037 A1 | 11/2019 | Douglas-Middleton et al. |
| 2021/0157535 A1 * | 5/2021 | Omiya ................. G06Q 20/209 |

FOREIGN PATENT DOCUMENTS

| | | |
|---|---|---|
| EP | 3 674 925 A1 | 7/2020 |
| EP | 3 679 467 A1 | 7/2020 |
| WO | 2019/049140 A1 | 3/2019 |

* cited by examiner

SYSTEM AND METHOD FOR EXCHANGING AND PREFLIGHTING DOCUMENTS FOR PRINTING AND PUBLISHING

CROSS-REFERENCE TO RELATED APPLICATIONS

This is the U.S. National Phase of International Application No. PCT/EP2022/055867, filed Mar. 8, 2022, which claims priority to U.S. Provisional Application No. 63/158,637, filed Mar. 9, 2021. The disclosure of each of these applications is incorporated herein by reference in its entirety for all purposes.

BACKGROUND OF THE INVENTION

In preparing documents for printing, print customers may encounter one or more issues that would require the customer to have to resubmit the job file, such as the file not matching specifications, such as with respect to image resolution. Low-resolution images must be replaced or approved to print as-is. For example, screengrabs and internet images typically do not meet print production standards. Small images stretched to large dimensions become poor reproductions. Sometimes, the print customer may use a low-resolution placeholder image to lay out text in a production file (to minimize file size), but may inadvertently fail to replace the placeholder with the corresponding high-resolution image after the layout has been finalized.

A job file may be printable, but may not match the job ticket specifications for other reasons, such as job type, number of pages, expected color separations, font problems, and the like.

Missing fonts have historically frustrated printers. Fonts that are not embedded may print incorrectly or not at all. One best practice is to embed the fonts rather than asking for fonts later. Flagging missing fonts at on-boarding (the step when a print shop accepts a file for printing) prevents the need for font substitution by a prepress group or by the raster image processor (RIP), and ensures text will appear as expected and without reflow.

Insufficient bleed in a file does not stop it from being printed, but may be needed for a clean trim appearance and, ultimately, a satisfied customer. Checking bleed amount with production standards avoids a need for later file manipulation to create "fake" bleed in the file, and ensures accurate reproduction at trim edges.

Aside from RIP-related issues, an incorrect trim size in a document submitted for printing (e.g. typically in Portable Document Format, commonly referred to as a "PDF document" or "PDF") generally needs to be flagged as early as possible. Checking trim size in the file versus the job ticket and checking for inconsistent trim sizes from page-to-page within the PDF is desirable for page-orientation consistency.

Customers are often frustrated by printers hindered by long turnaround times getting feedback from prepress groups before they can reply to a customer. Thus, there is a need in the art to be able to easily analyze a job file and respond to a customer within minutes instead of hours or days."

Thus, there is a need in the art to check files prior to printing (often referred to as "preflight checking" by analogy to checking soundness of an airplane by pilots and/or crew before taking off). In particular, there is a need to enable less skilled operators to implement the preflight process without having to get highly skilled prepress specialists involved. Thus, there is a need in the art for a software tool usable by lay people (not skilled prepress technicians) for analyzing documents (e.g. PDFs) submitted for a printing job, that allows the lay user to implement a basic preflight check and provide feedback to the customer, and transmit an approved job file to a prepress group for printing.

SUMMARY OF THE INVENTION

One aspect of the invention relates to a computer implemented method for enabling a customer service representative (CSR) to review a print job including a digital graphics file intended for printing on a predetermined printing system. The method comprises receiving an incoming electronic communication from a customer containing job instructions in text, and the digital graphics file as an attachment; providing a user interface configured with one or more job instruction presets to permit the CSR to select at least one job instruction preset corresponding to the job instructions; and performing, with a computer processor, a preflighting operation on the digital graphics file based upon the job instruction presets and information about the predetermined printing system. The preflighting operation includes determining if the digital graphics file contains information required for printing the job with the selected job instruction presets on the predetermined printing system, if the digital graphics file is within a predetermined resolution range, and if graphics embodied in the digital graphics file meet predetermined bleed criteria. The method includes providing a user interface comprising a display screen having a first area, a second area, a third area, and a fourth area, with the information about the graphics file and annotations relating to results of the preflighting operation displayed in the first area, a page of the job displayed in the second area, selectable thumbnail images of pages of the job displayed in the third area, and selectable job instruction presets displayed in the fourth area. User selection of a thumbnail in the third area is operable to cause the page displayed in the second area to correspond to the selected thumbnail in accordance with the selectable job instruction presets selected by the user in the fourth area. If the preflighting operation contains rejection determinations, the method includes providing a prepopulated outgoing electronic communication addressed to the customer and containing information about the preflighting operation rejection determinations. If the preflighting operation contains no rejection determinations, the method includes saving the job instructions and the digital graphics file to computer memory, and providing an automatic notification to a prepress operation address indicating that the job is ready for further processing.

Providing the user interface may include providing the first area as a sidebar located on a left side of a display screen, the third area as a sidebar located on a right side of the display screen, the second area as a center region located between the left sidebar and the right sidebar, and the fourth area as a toolbar positioned above the first, second, and third areas. A user-selectable option may be provided for causing preparation of an electronic communication to the sender of the incoming communication, the electronic communication comprising text with information corresponding to the annotations relating to results of the preflighting operation. Preparation of the electronic communication may comprise the processor providing automatically prepopulated text, which may be user-editable. The user may be provided with user-selectable options to save the electronic communication to a clipboard, or create an email using a preselected email option. The text of the electronic communication may appear in a fifth area of the user interface, such as a pop-up box positioned on a left side of the second area.

The method may include providing a user-selectable option to save the job file and a user-selectable option to prepare an electronic notification to a prepress group comprising text. Preparing the electronic notification may comprise the processor providing automatically prepopulated text that is user-editable. The use may be provided with user-selectable options to save the electronic notification to a clipboard, or to create an email using a preselected email option. The text of the electronic notification may appear in a sixth area of the user interface, such as in a pop-up box positioned on a right side of the second area. The method may include providing the user with a user-selectable option to add a preset. In embodiments, each preset may include user-definable criteria including minimum image resolution and bleed requirements, including minimum bleed size.

Another aspect of the invention relates to a system for enabling a customer service representative (CSR) to review a print job including a digital graphics file intended for printing on a predetermined printing system. The system comprises a computer processor and a non-transitory computer memory medium accessible by the computer processor. The computer memory medium has stored thereon machine-readable instructions for causing the computer processor to perform various steps, including the steps of receiving the incoming electronic communication, providing the user interface configured with one or more job instruction presets to permit the CSR to select at least one job instruction preset corresponding to the job instructions; and performing, with the computer processor, the preflighting operation on the digital graphics file based upon the job instruction presets and information about the predetermined printing system, as described herein. The instructions include instructions for providing the user interface comprising the display screen having the first area, second area, third area, and fourth area as described herein, and instructions for providing the prepopulated outgoing electronic communication addressed to the customer if the preflighting operation contains rejection determinations, and providing the automatic notification to the prepress operation address if the preflighting operation contains no rejection determinations.

Yet another aspect of the invention relates to a non-transitory computer memory medium having stored thereon machine-readable software instructions that, when executed by a processor, cause the processor to perform the steps as described above.

DETAILED DESCRIPTION OF THE INVENTION

Figure 1:
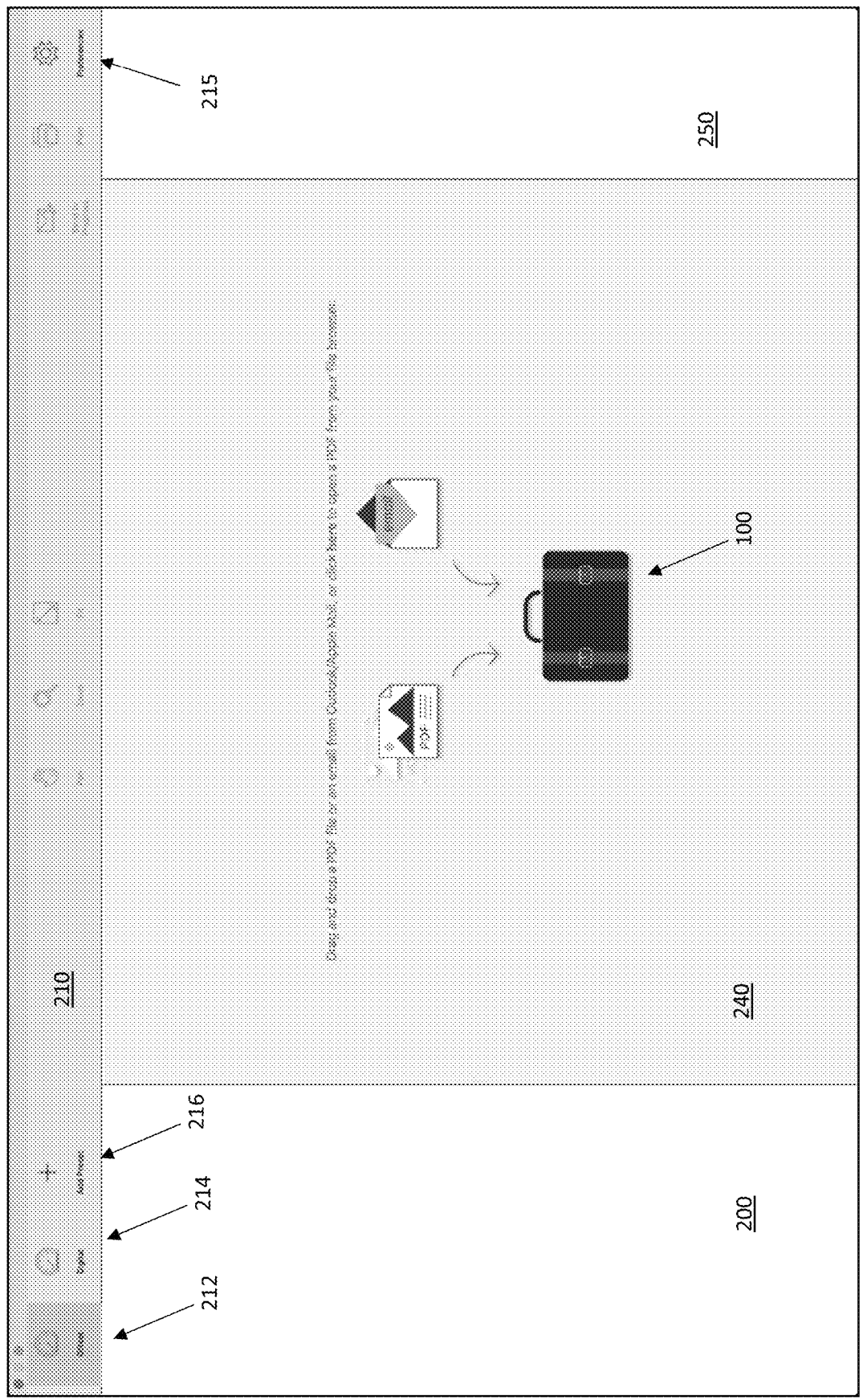
FIG. 1 depicts an exemplary initiation screen associated with an embodiment of the invention for initiating processing of a document using the user interface.

Electronic publishing workflows are subject to inconsistent content component standards and corresponding consolidated electronic file translations. For example, component files such as image and text files are produced by a variety of applications. These component files are typically integrated into a page format or "consolidated file" such as a PDF, TIFF, XML, and/or POSTSCRIPT® formatted file, such as but not limited to an Encapsulated PostScript (EPS) file. Although PDF has emerged as the preferred file type for sending print jobs in the field of printing, and may be exclusively referenced in examples herein, the invention is not limited to use only with PDF documents. The term "job file" is used generically herein to refer to any and all suitable file types for printing.

One aspect of the invention comprises a stand-alone software tool that gives a lay user the ability to quickly validate an incoming job file (such as a PDF) and, if problems are round, provide instant feedback to the supplier of the file.

A user first launching the software tool can review one or more predefined job specifications ("presets"), for example Offset or Digital, and add additional specifications, if desired. When a job is transmitted to the user, such as via an email, the user opens the email with the job file attachment in the software tool, and the software tool instantly checks (i.e. preflights) the job file against the available presets. Exemplary preflight functions may include verifying that there are no missing fonts, no images with a resolution below a predetermined threshold, that bleed is acceptable, that trim sizes are correct, and to advise if there are non-CMYK objects present in the file.

If the job file meets the job specifications, the user can send the job file to a prepress department using a predefined message. If there preflight issues are identified, the software may create a predefined report to the customer that explains the issues. The user may have the option of creating these reports in multiple languages. All of the foregoing may be facilitated without the user exiting the software tool and without the lay user having to ask for help from the technically-trained prepress department.

Setting up the software tool may comprise downloading and running an installer, signing in to software tool, reviewing preferences (e.g. language, length unit, default email application), reviewing existing presets and adding missing presets, if necessary. The first time a user signs in to the software tool, that user may have the opportunity to enable the user-interface dashboard. The user may then set preferences. The software may permit a number of settings to be customized. For example, a user may be able to select a "Preferences" button, or alternatively, make a "Preferences" selection from a menu, such as a drop down menu.

Customizable settings may include "Application Language" (e.g. language in which the user interface (UI) is displayed (e.g. English, French, German, Italian, Portuguese, Russian, Spanish; etc.); "length unit measurement used" (e.g. Millimeters, Centimeters, Inches, Points); default email application for forwarding messages from within the software tool to reply to the customer or send dialog to the prepress department (e.g. Outlook®, Apple Mail). Some changes in customizable settings (e.g. application language) may require a restart of the software, whereas others may be applied immediately.

A preset is a job specification against which the incoming job file is checked, in addition to default checks (e.g. for missing fonts and trim size). Presets may include customizable parameters, such as minimal image resolution and required bleed. The software tool may be configured with predetermined presets, such as one for offset printing, and one for digital. User-defined presets may also be created, such as for a particular workflow or type of printer.

Typically a document to be validated with the software tool is transmitted to the user as an attachment to an email. The process of validating the attached file includes opening the email using the software tool, such as is illustrated in FIG. 1, which shows an exemplary user-interface (UI) display screen. As shown on the exemplary screen, on-screen instructions in a center portion 240 of the screen direct the user to: "Drag and drop a PDF file or an email from Outlook/Apple Mail, or click here to open a PDF from your file browser." From the menu of the file browser (not shown), the user may thus select "File" then "Open" and then select the file from the file browser, using the browser user interface, as is commonly known in the art. The user may then drag and drop the file (i.e. using a cursor controlled by a user input interface such as a mouse, trackball, touch-screen, and/or the like, such as e.g. by clicking and holding a mouse button while hovering over a file name or icon to and then moving the file or icon on the screen by moving the mouse) onto a predetermined icon or area of the screen (e.g. any part of section 240) associated with the instant software (e.g. suitcase 100 as depicted in FIG. 1) in a Finder window (Mac) or in Explorer (Windows) to open the file and activate the functions of the software. Thus, the user can select (using a mouse or other cursor command) an email and drag that email to icon 100, which will then cause the file to be opened in the software. Other methods of opening the file may also be provided, such as any methods commonly known in the art for opening a file with a software program.

The UI display screen also includes a toolbar 210 with various selectable buttons, including gauge icons labeled "Offset" 212 and "Digital" 214 for pre-existing presets, and gives the user an option to "Add Preset" 216 with a plus-sign icon. A gear icon labeled Preferences 215 permits a user to set preferences for operation. Other icons depicted on the screen with gray (rather than black) text labels are not actionable from the initiation screen and will be discussed in more detail herein later.

FIGS. 2, 3, 5-7 depict the appearance of the UI display screen after the document preflight validation has been initiated. Status of the instant validation is shown in the left sidebar 200, corresponding to the selected preset ("Offset" 202, as depicted). The validation may be performed for all presets. A checkmark (e.g. color-coded in green) as part of the icon corresponding to each preset 212, 214 in the toolbar 210 may signify that the file has passed (i.e. the file matches all specifications), and an "X" (e.g. color-coded in red), as depicted for both presets 212, 214 in FIG. 2) may signify that errors have been detected. The details of each preflight validation may be further inspected by selecting the relevant preset button (e.g. preset 212). The preset that is active ("Digital" in the example shown in FIG. 2) is highlighted on the toolbar 210.

Figure 2:
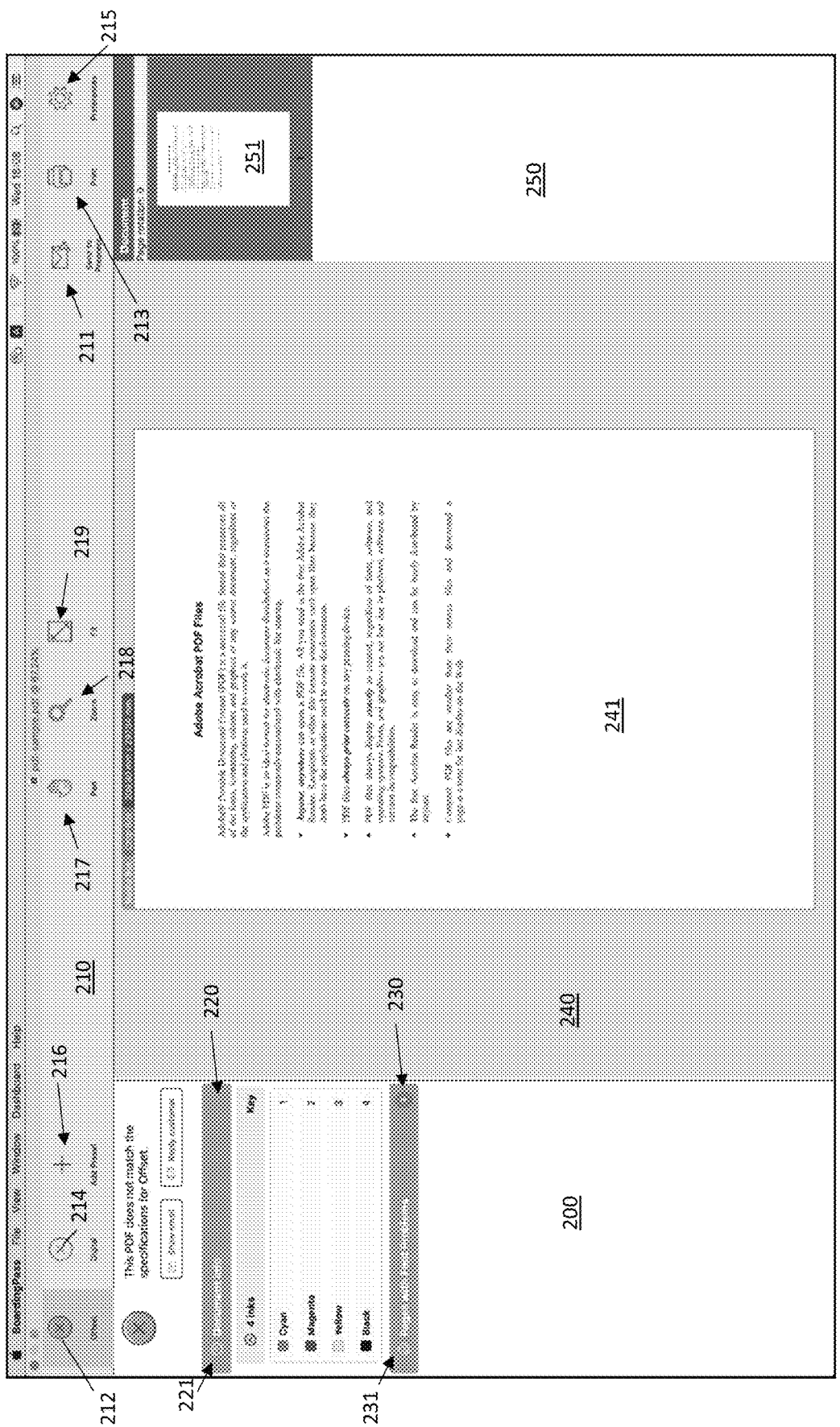
FIG. 2 depicts an exemplary user interface associated with an embodiment of the invention processing a first document.
Figure 3:
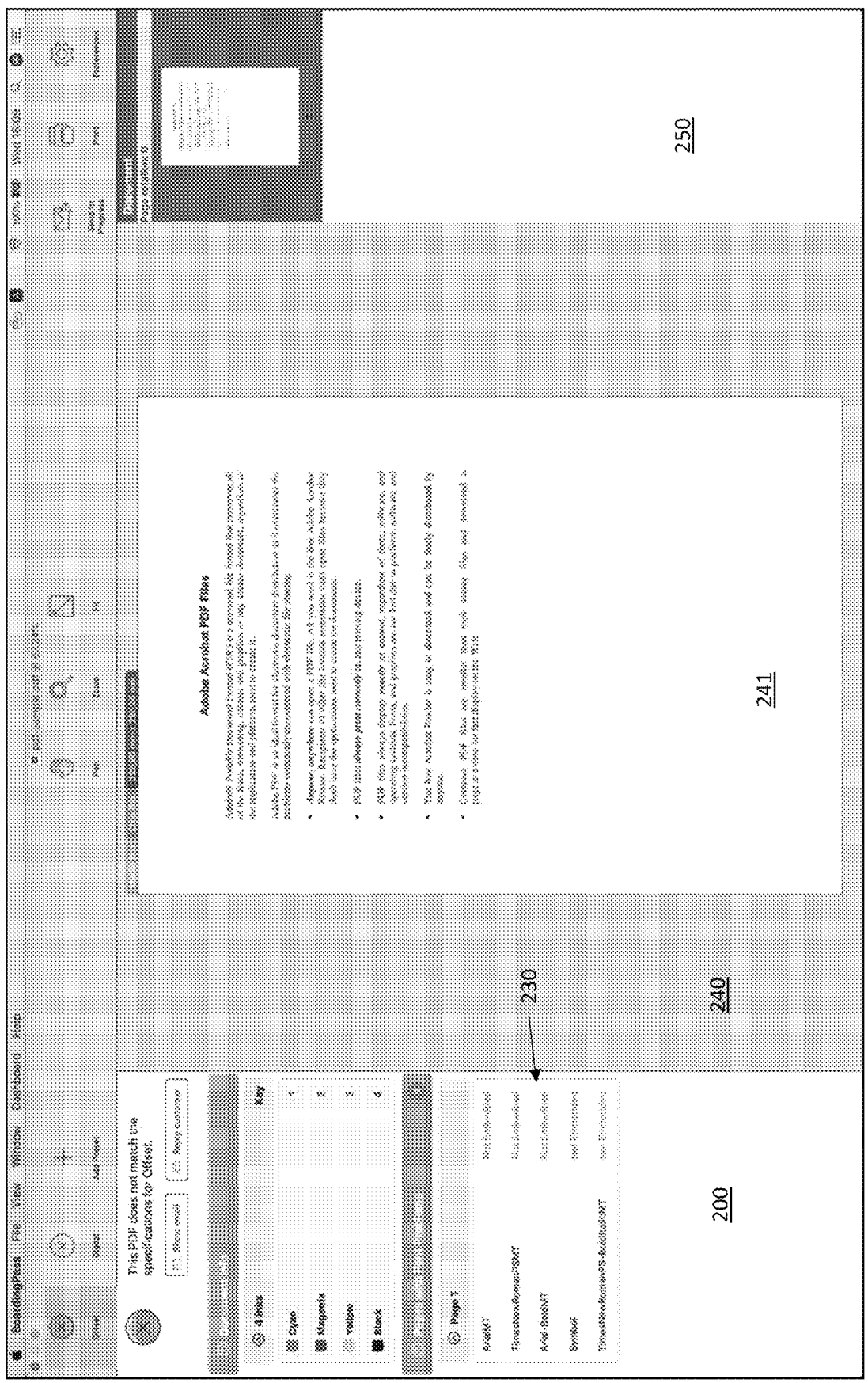
FIG. 3 depicts the exemplary user interface of FIG. 1 showing exemplary preflighting results relating to fonts for the first document.

Left sidebar 200 provides information regarding whether the file matches the selected preset. Left sidebar 200 may contain multiple panels 220, 230 (which can be collapsed or expanded by selecting arrow icons 221, 231, respectively) with information about the selected file, for example about the inks, missing bleed, or low image resolution. For example, the "Document info" expandable panel 220 (e.g. a dropdown menu of selectable choices) may show identifying information corresponding to each separation, such as ink color labels (e.g. "Cyan," "Magenta," "Yellow," and "Black," with accompanying squares of matching color, as shown in, e.g., FIG. 2, or specific Pantone® colors, as shown in, e.g., FIG. 8). Specific issues identified in the validation (e.g. "Pages with Font Problems" as shown in FIG. 2) may be displayed in a second expandable panel 230 in the left sidebar 200, shown in FIG. 2 unexpanded form, and as shown in FIG. 3 in expanded form. In expanded form, panel 230 lists fonts in the document having associated errors (e.g. "ArialMT") on the left, and the error (e.g. "Not Embedded") on the right.

Figure 6:
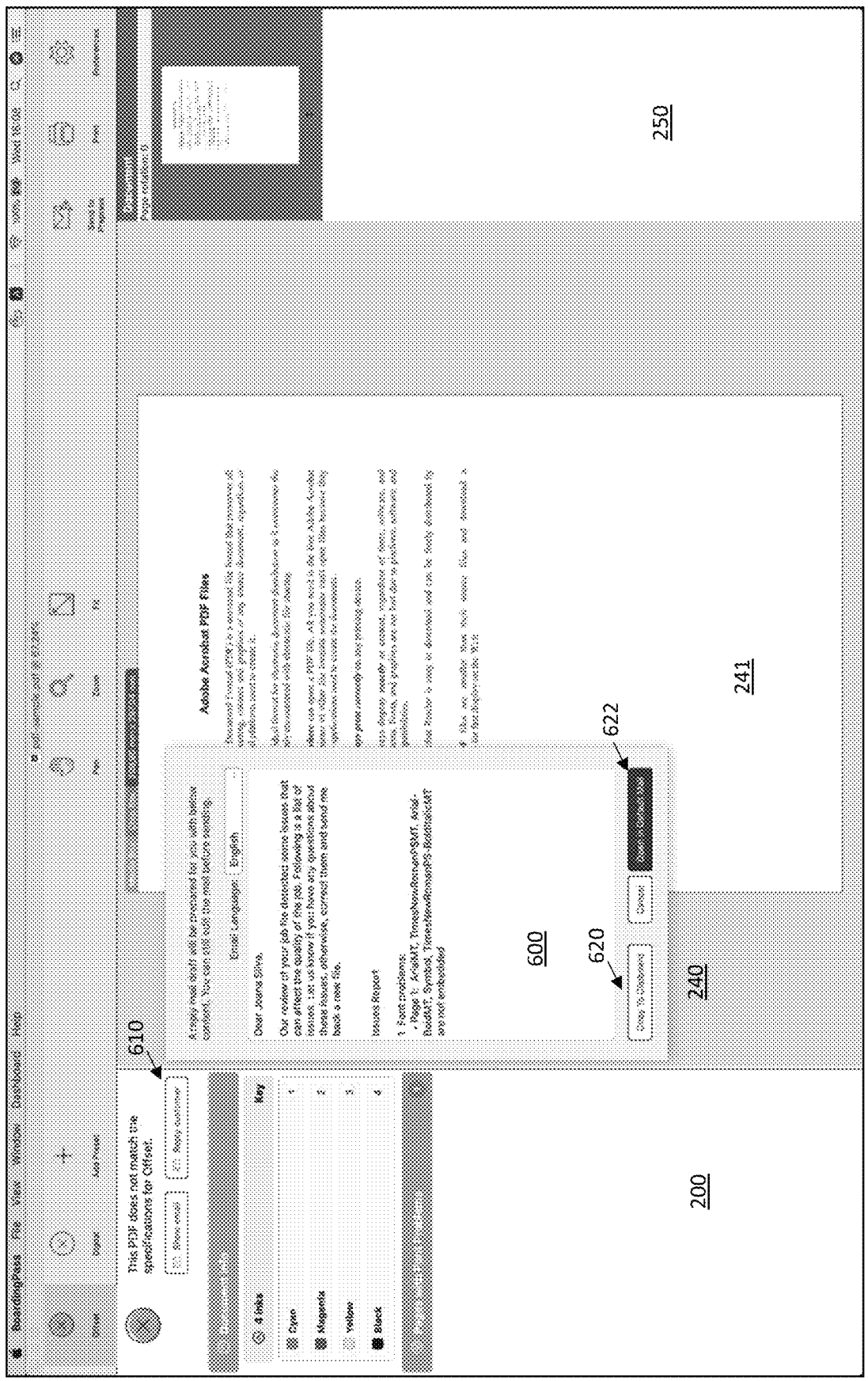
FIG. 6 depicts the exemplary user interface of FIG. 1 showing an exemplary outgoing communication of preflight results to the sender of the incoming preflighted document.
Figure 7:
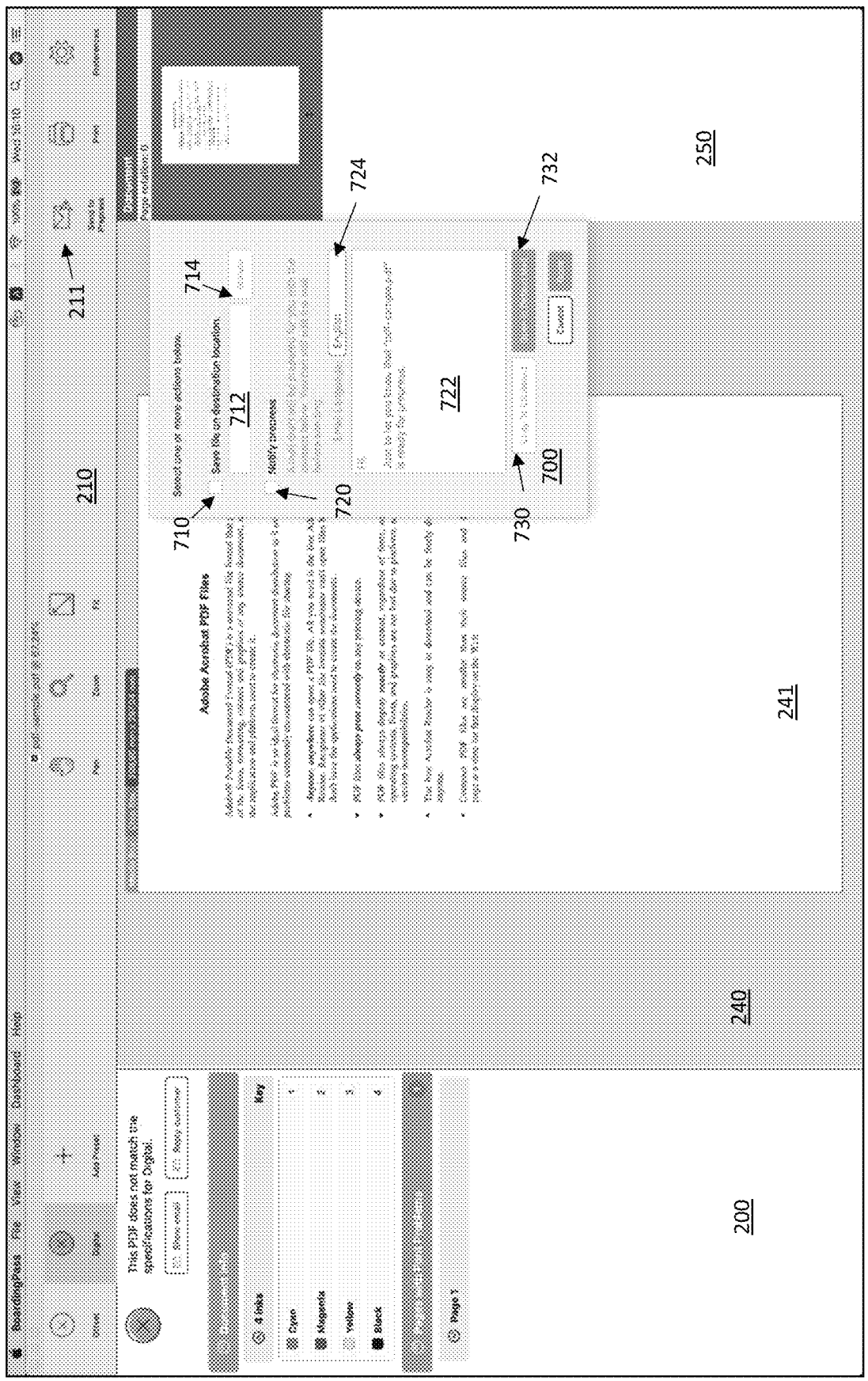
FIG. 7 depicts the exemplary user interface of FIG. 1 showing an exemplary communication to a prepress department relating to the first processed document.
Figure 8:
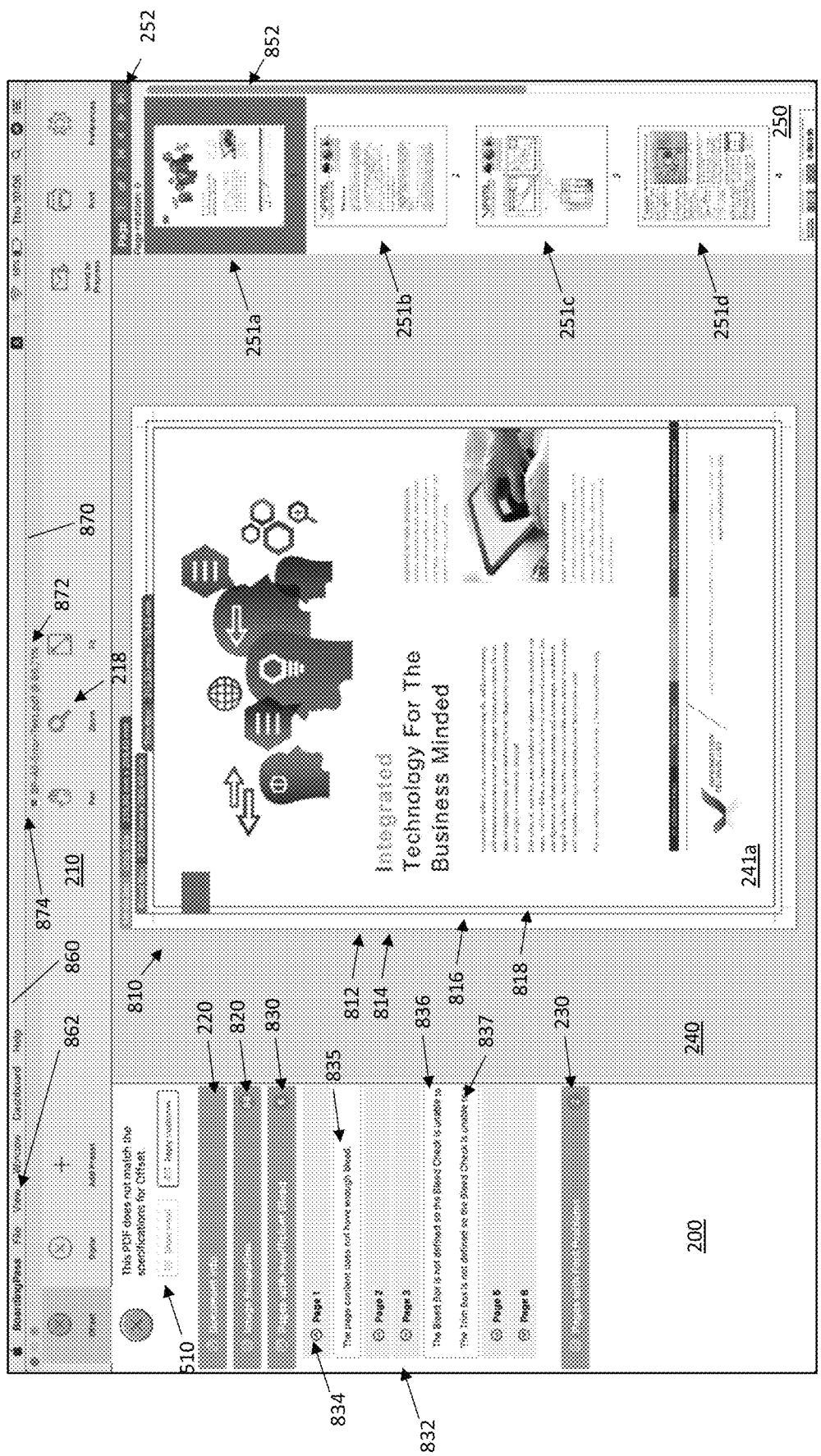
FIG. 8 depicts the exemplary user interface of FIG. 1 showing exemplary preflighting results relating to bleed for a second processed document.
Figure 9:
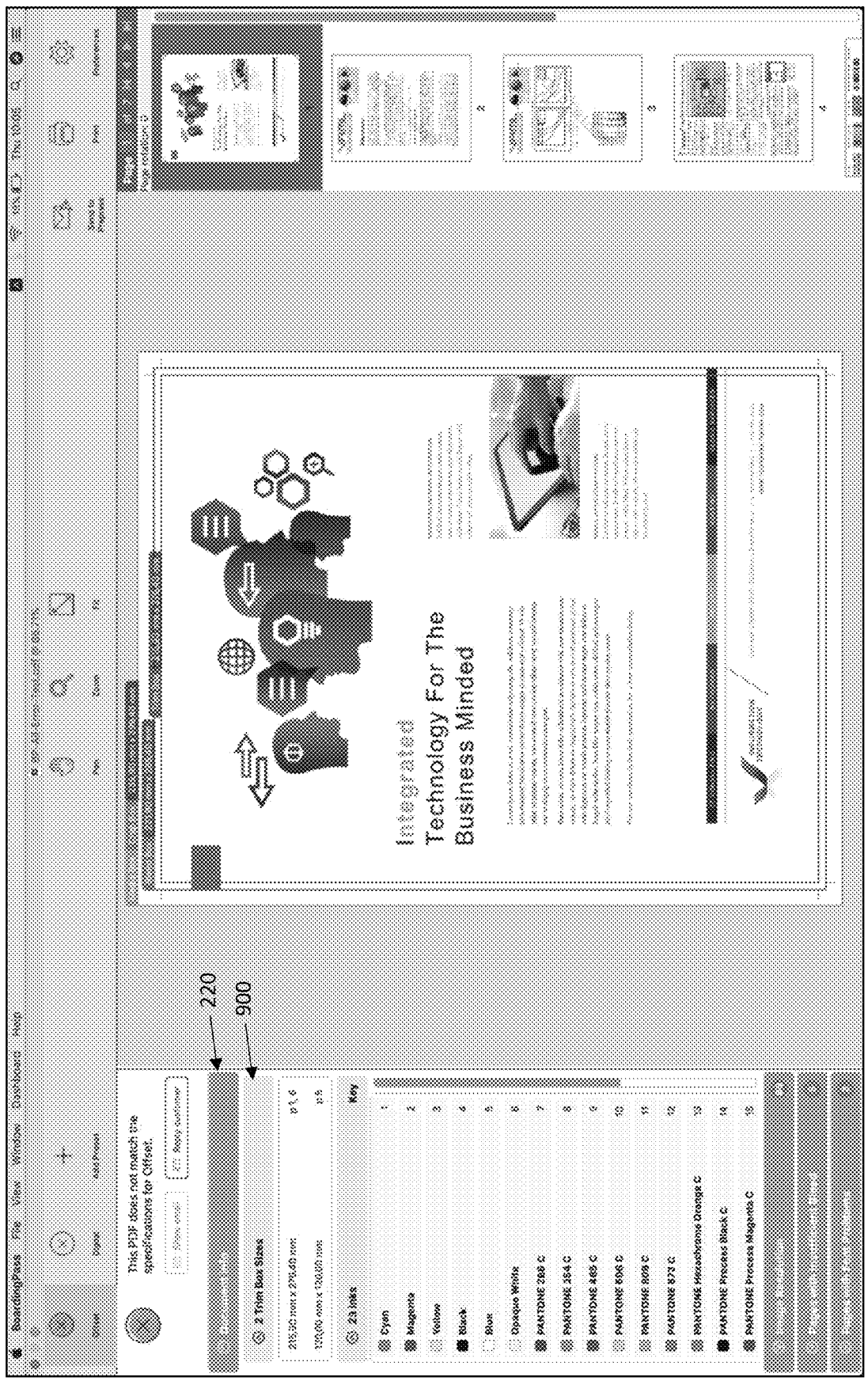
FIG. 9 depicts the exemplary user interface of FIG. 1 showing exemplary drop down information related to "Document Information."
Figure 10:
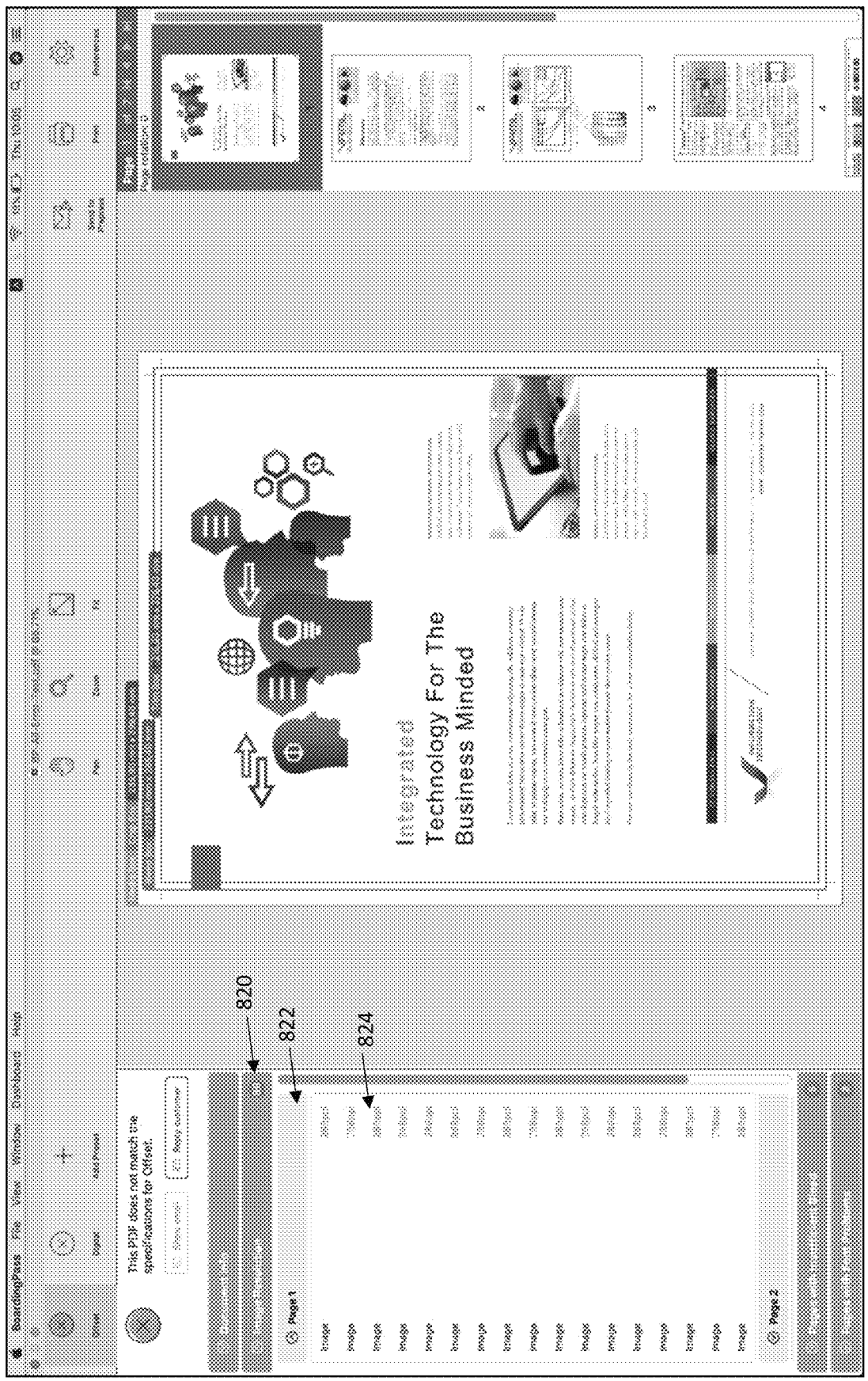
FIG. 10 depicts the exemplary user interface of FIG. 1 showing exemplary drop down information related to "Image Resolution."

FIGS. 2, 3, and 5-7 depict the UI display for a single page text document is shown, whereas FIG. 8-10 depict the display for multi-page document with graphics. For graphics documents, additional expandable panels may be presented in the left sidebar 200. For example, expandable panel 820, shown unexpanded in FIG. 8 and expanded in FIG. 10, shows "Image Resolution" issues, and expandable panel 830, shown expanded in FIG. 8, shows issues related to "Pages with Insufficient Bleed." As shown in FIG. 8, panel 830 lists the number 832 of each page having bleed issues, and provides an arrow 834 associated with each page number, operable to expand or contract the subpanel that provides additional information about the error(s) detected for each page. The additional information may include warnings such as "The page content does not have enough bleed" 835; "The Bleed box is not defined . . . " 836 or "The Trim box is not defined . . . " 837.

The UI display screen toolbar 210 may display, in addition to the "Offset" preset 212, "Digital" preset 214, and "Add Preset" option 216 on the left, icons corresponding to tools for inspecting the job file ("Pan" 217, "Zoom" 218, and "Fit" 219) in the center, and "Send to Prepress" 211, "Print" 213, and "Preferences" 215 buttons on the right. Selecting the "Fit" 219 button in the toolbar 210 causes the displayed page size to be expanded or contracted to fit in the central region 240. Selecting the "Pan" button 217 allows the user to move the view shown in the center region 240 horizontally or vertically by permitting the user to click the "Pan" button in the toolbar and, once the button is highlighted, move the screen part that the user wants to see.

Figure 4A:
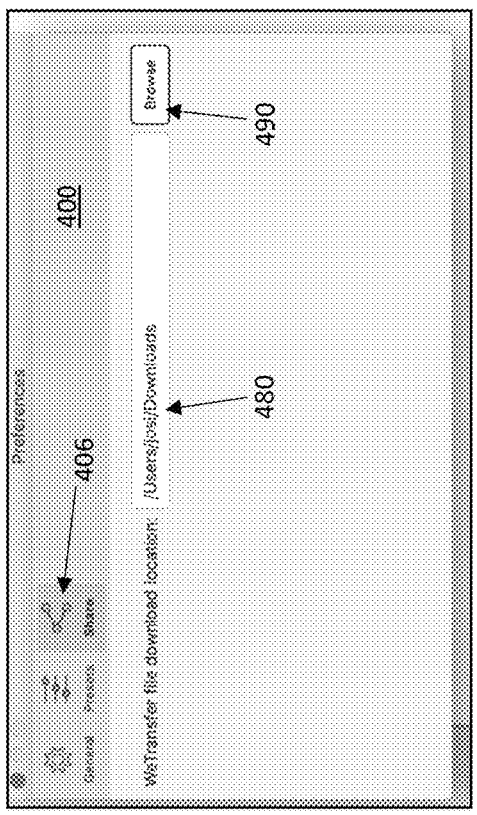
FIG. 4A depicts an exemplary general preferences menu associated with one embodiment of the invention.
Figure 4B:
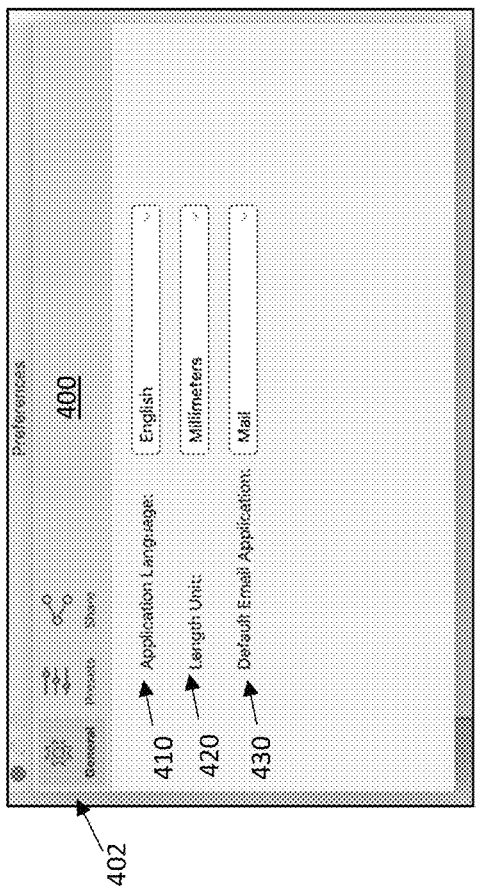
FIG. 4B depicts an exemplary presets preferences menu associated with one embodiment of the invention.
Figure 4C:
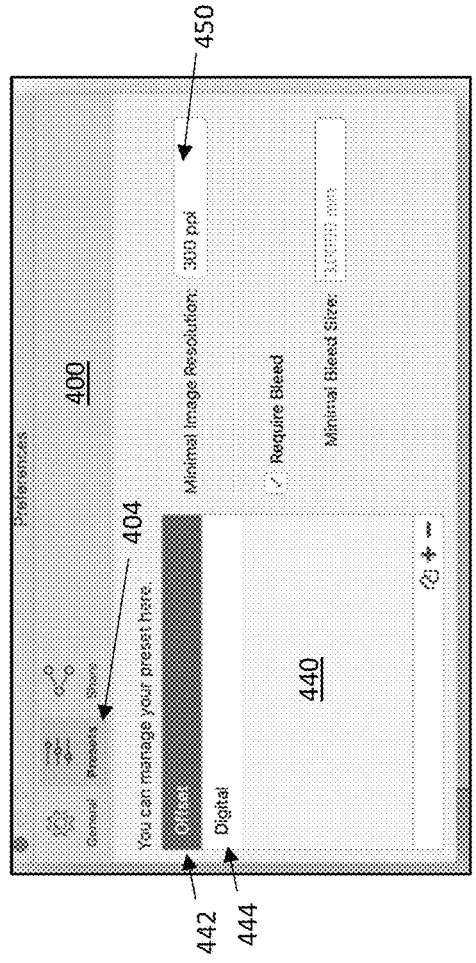
FIG. 4C depicts an exemplary sharing preferences menu associated with one embodiment of the invention.
Figures 4D, 4E:
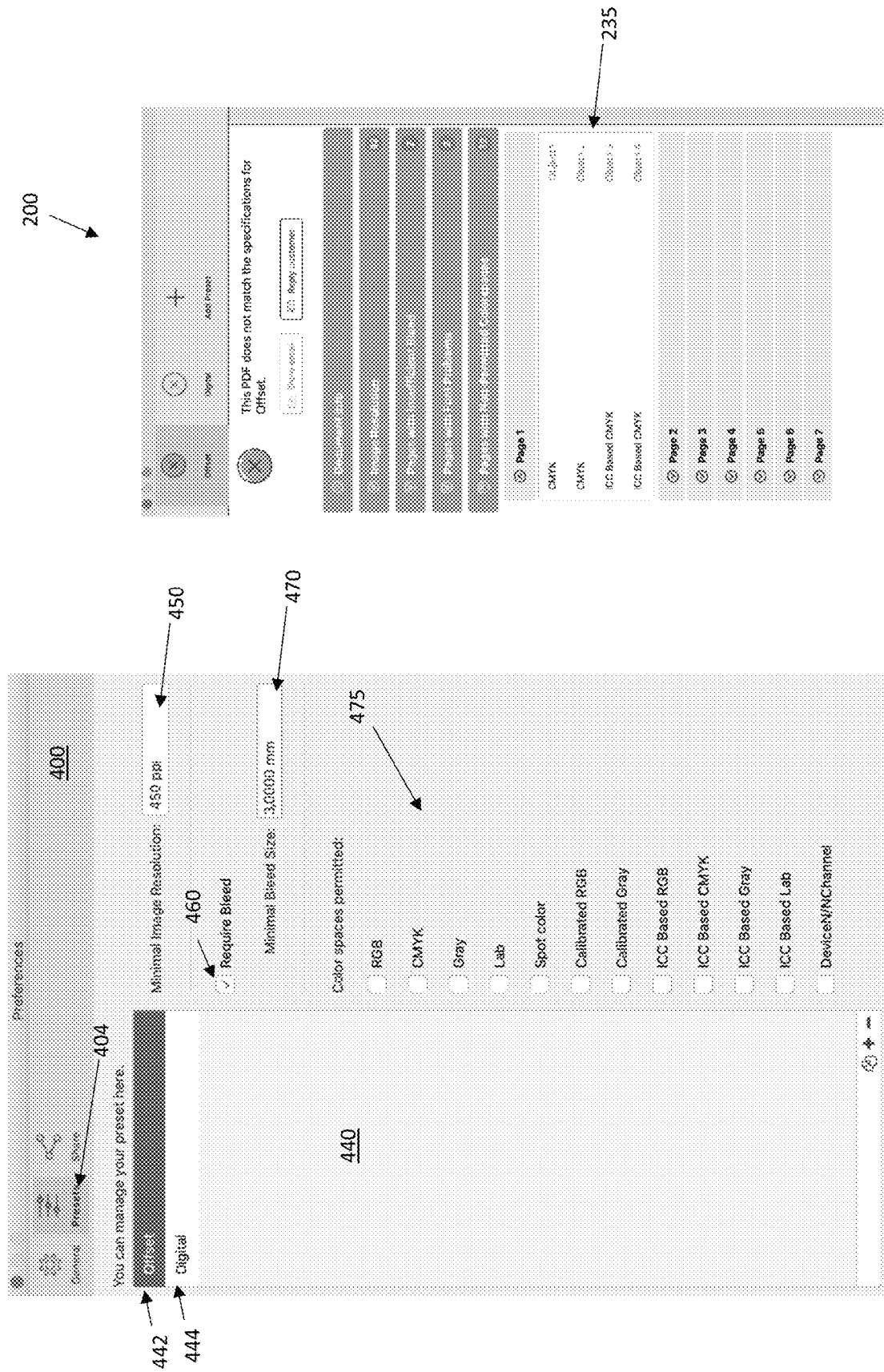
FIG. 4D depicts an exemplary presets preferences menu associated with another embodiment of the invention.
FIG. 4E depicts an exemplary left sidebar associated with the embodiment of the preset preferences menu depicted in FIG. 4D.

FIGS. 4A-4C depict exemplary drop-down menus presented in response to a user selecting the "Preferences" button 215. As depicted in FIG. 4A, the selectable preferences presented when a user selects the "General" icon 402 on the Preferences toolbar 400 include: "Application language" (e.g. "English") 410; "Length Unit" (e.g. "Millimeters") 420; and "Default Email Application" (e.g. "Mail") 430. As depicted in FIG. 4B, the selectable preferences presented when a user selects the "Presets" icon 404 on the Preferences toolbar 400 include a menu of presets 440 (e.g. "Offset" 442 and "Digital" 444 as depicted), with the selected preset highlighted ("Offset" as depicted), a field 450 for entry of the minimum resolution associated with the selected preset (e.g. 300 ppi [pixels per inch]), a check box 460 for selecting or deselecting "Require Bleed," and a field 470 for entry of the "Minimal Bleed Size" (e.g. "3.0000 mm"). As depicted in FIG. 4D, in other embodiments, the selectable preferences on the presets menu may include a list of color spaces permitted 475, with check boxes for each listed color space to permit selection thereof for inclusion as a permitted color space preference. In such embodiments, the left sidebar 200 of the UI display includes an expandable panel 235 for listing color space issues identified in the preflight validation. As depicted in FIG. 4C, user selection of the "Share" icon 406 on the toolbar presents a field 480 where the user can enter a "WeTransfer file download location," along with a "Browse" radio button 490 allowing the user to browse the user's accessible locations for selection of the file folder where the download is to be saved. WeTransfer is a third party service popular in the graphic arts industry for sharing large files. The invention is not limited to any particular such service, or file location, however, and destination location may be any location in computer memory identified using any type of label known in the art.

Central region 240 of the UI screen displays a selected page 241 of the job file to be preflighted. As depicted in FIGS. 2, 3 and 5-7, the display for a single page document is shown, but for documents with multiple pages, such as is depicted in FIG. 8-10, the user can display another page by selecting it in the right sidebar 250. Right sidebar 250 displays thumbnails (e.g. 251a, 251b, etc.) of the pages and allows the user to tab through the pages by selecting from the group of arrow icons 252 at the top of the right sidebar 250. When a user opens a second, third, etc. file, (not shown) each new file will be displayed in a separate window (user interface screen) (unless the user first closes the open file(s) through the File menu).

Figure 5:
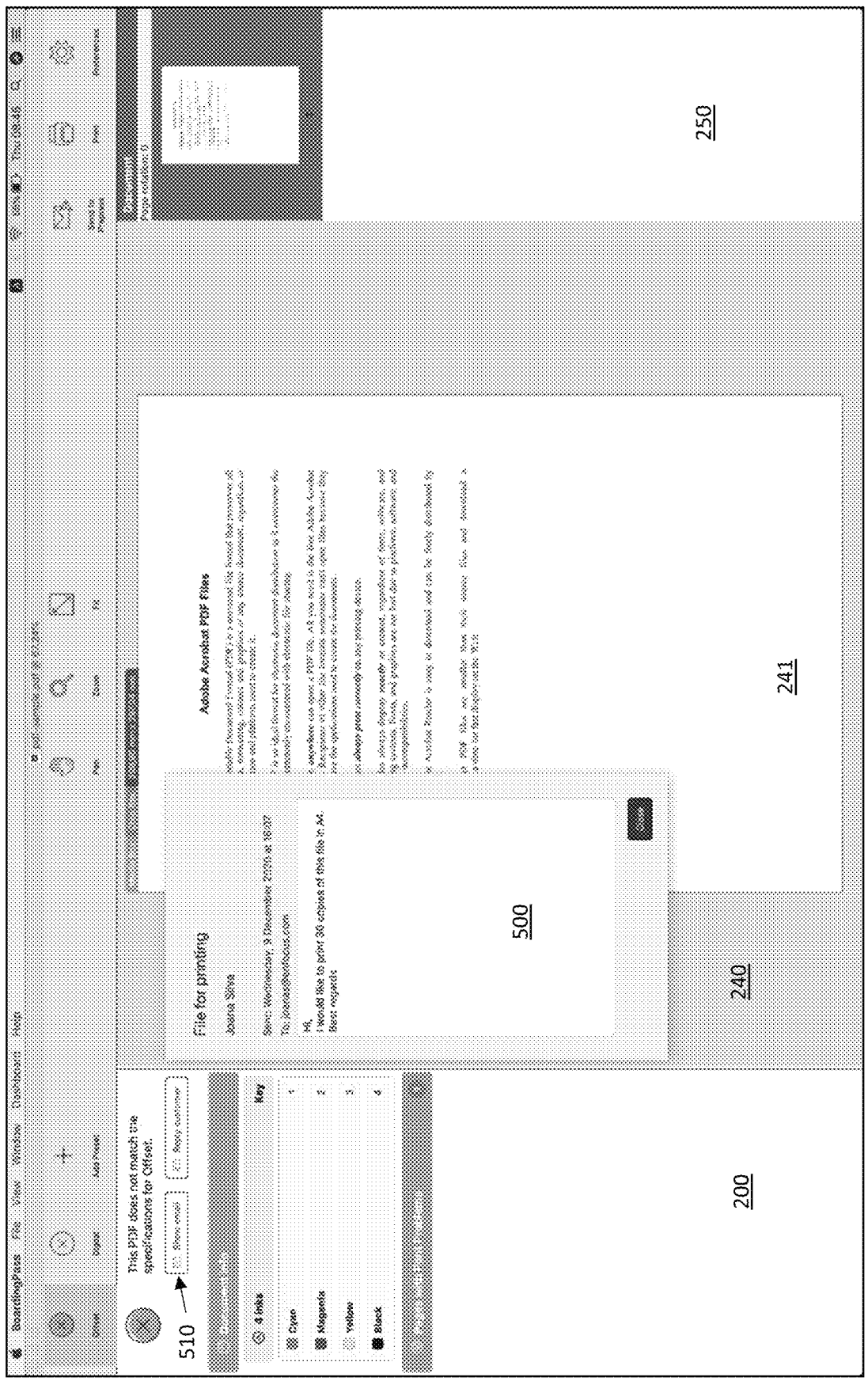
FIG. 5 depicts the exemplary user interface of FIG. 2 showing an exemplary incoming communication from a sender of an incoming preflighted document.

As shown in FIG. 5, the incoming email from a customer may be displayed in box 500 upon receipt of the job file for preflight validation, upon user selection of the "Show email" button 510 in the left sidebar 200. If a file does not match the job specifications (i.e. the preflight validation finds errors), the user may wish to draft a reply to the customer to advise of the issues that should be fixed before the file can be printed. To send a reply, the user selects the "Reply customer" button 610 to draft a reply. The email prepopulated in box 600 (as depicted in FIG. 6) contains an overview of the issues identified. The user can edit the prepopulated email as desired. The user may then select the "Copy To Clipboard" button 620 (for example, if the user wants to copy the contents for pasting into an email created with a non-default email software and send it from that software), or the "Open in Default Mail" button 622 (to open the draft in a default email application). The email opened in the default email software may populate the "To" field of the email (with the email address of the sender of the job file), and may populate the "Subject" field (with a "Re:" followed by the subject of the email received from the sender of the job file). The user may then send the email using the corresponding "Send" function of the default email (not shown). Composition of the email in box 600 allows the user to compose the email within the application, where the user can see the errors in left sidebar 200 to help the user modify the email text as needed.

To send the PDF file to prepress group (e.g. when the file matches job specifications), the user can save the file locally and/or send it to the prepress from within the software tool, by selecting "Send to Prepress" button 211 in the toolbar 210, which causes pop-up box 700 to be displayed, as depicted in FIG. 7. Box 700 includes an selectable option 710 (e.g. a checkbox) for selecting the destination location to save the file, including a field 712 for entry or display of the file name, and a Browse radio button 714 to facilitate browsing of file locations. Once selected, the location may be remembered, so the user may not have to select it the next time (unless the user desires the file to be saved elsewhere). Box 700 also includes a selectable option 720 (e.g. a checkbox) to "Notify prepress", with a field 722 for composing the email, and a selection field 724 to select the email language (e.g. English) for prepopulated content. Selecting "Notify Prepress" may cause a draft text to prepopulate in field 722 in the selected language. In some embodiments, the user may then be able to amend the text as desired, whereas in other embodiments the prepopulated content may not be editable, and then may select the "Copy to Clipboard" button 730 (for example, if the user wants to copy the contents for pasting into an email created with a non-default email software and send it from that software), or the "Click Open in Default Mail" button 732 (to open the content as a draft email in a default mail application). The default email (not shown) may open with the "subject" and "content" fields of the email filled in, but the user may need to add information about the original sender of the job file (i.e. the customer) or add the recipient name in the "To" field and take appropriate action to "send" the email. The file may then be saved to the chosen location.

Thus, to recap, in an exemplary embodiment, the user receives the job file via a supported type of email, and opens the email containing the attachments, rather than having to download and open each attachment. Information about the job is made available to the software tool, and the user can draft a reply to the customer using the software tool. To open the job for processing, as depicted in FIG. 1, the user drags and drops the email (e.g. from an inbox) to the software tool UI display screen or to an icon corresponding to the software in a graphic display showing applications resident on a particular computer system. If the email does not contain an attachment, or if the attachment is not a compatible file (e.g. a PDF), a warning may be displayed. Users may be able to drag and drop multiple mails in one step; or may only be able to drop one mail at a time.

Referring now to FIGS. 8-10 that depict use of exemplary software with an exemplary multi-page graphics file, the selected page of the PDF file 241a is shown in the central region 240 of the screen. In the right sidebar 250, thumbnails of the pages (251a, 251b, 251c, 251d) are displayed. The user can page through the document by clicking the arrows at the top 252. If the mail contains multiple attachments, each attachment may be opened and validated in a separate window. The user may view the content of the mail by selecting, e.g., the "Show email" button 510. The content of the mail, as well as the sender, the addressee(s), and the date may be displayed, as shown in box 500 in FIG. 5.

As described, in some embodiments, the software tool may instantly validate a file when opened. The user may then check the reported issues, including manually verifying the issues in the file. Available information about the file may be displayed by expanding the panels in the left sidebar. As described previously, the "Document Info" panel 220 may always be available (regardless of the error status of the file). This panel contains information about the inks, as shown in, e.g., FIGS. 2 and 8, and trim box sizes in expandable panel 900, as depicted in FIG. 9. As illustrated in FIG. 8, page boxes 810 (e.g. media box 812, crop box 814, bleed box 816, trim box 818) may be visualized in the central region 240 of the screen, as labeled, with dimensions displayed, at the top of each. As depicted in FIG. 8, the media box 812 and crop box 814 are defined by a shared periphery in the file under review. The length unit (e.g. "mm") displayed for the dimensions of each box may be changed using the Preferences functionality, as described herein above.

To page through the document, the user may use the arrows 252 at the top of the right sidebar 250, or use the scrollbar 852, with the selected page (e.g. 251a as depicted) being highlighted in the right sidebar 250 and displayed in enlarged form (e.g. 241a) in the central region 240 of the screen. Alternatively, the user may select the page to display using the menu 860 above the toolbar, by selecting "View" 862 and then selecting "Go To" and then one of "First" "Previous" "Next" or "Last" (page) in the resulting drop down menus (not shown).

As described above with respect to FIG. 2, the user interface may allow the user to select the zoom level of the PDF by, for example, selecting the "Zoom" button 218 in the toolbar 210 and, once highlighted, selecting an area in a portion of the document 251a in center region 240 to zoom in. To increase the zoom level, the user may select "Option/Ctrl+" and to reduce the zoom level, may select "Option/Ctrl -." From the menu, the user may select "View" 862 and then select "Zoom" and choose from zoom options (e.g. "Fit in Window," "Actual Size," "Zoom In," or "Zoom Out") in the dropdown menu that is presented (not shown).

The current zoom level 872 (e.g. "66.71%" as depicted) is shown in the header 870 next to the name of the opened file 874 (e.g. "BP-All-Error-Test.pdf" as depicted). If only a part of the page is displayed, the user can see which part is shown in a view window (not shown) displayed in the corresponding thumbnail in the right sidebar 250. The user may move the view window by dragging it to another position on the page. To rotate the view, the user can select "View" button 862 and then select "Rotate View" and "Clockwise" or "Counterclockwise" from the corresponding drop down menu (not shown).

Figure 11A:
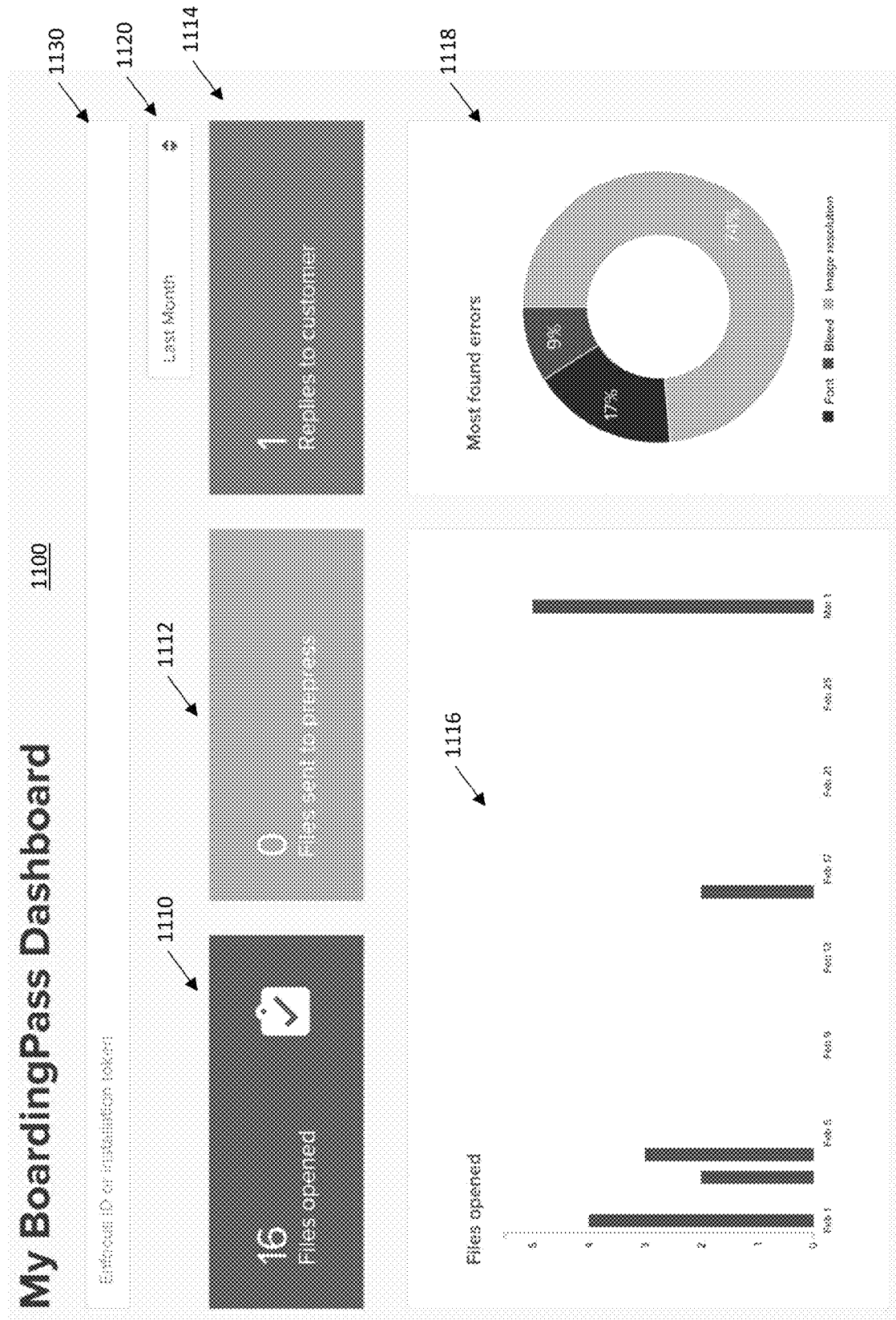
FIG. 11A depicts a first exemplary statistics dashboard screen or portion thereof.
Figure 11B:
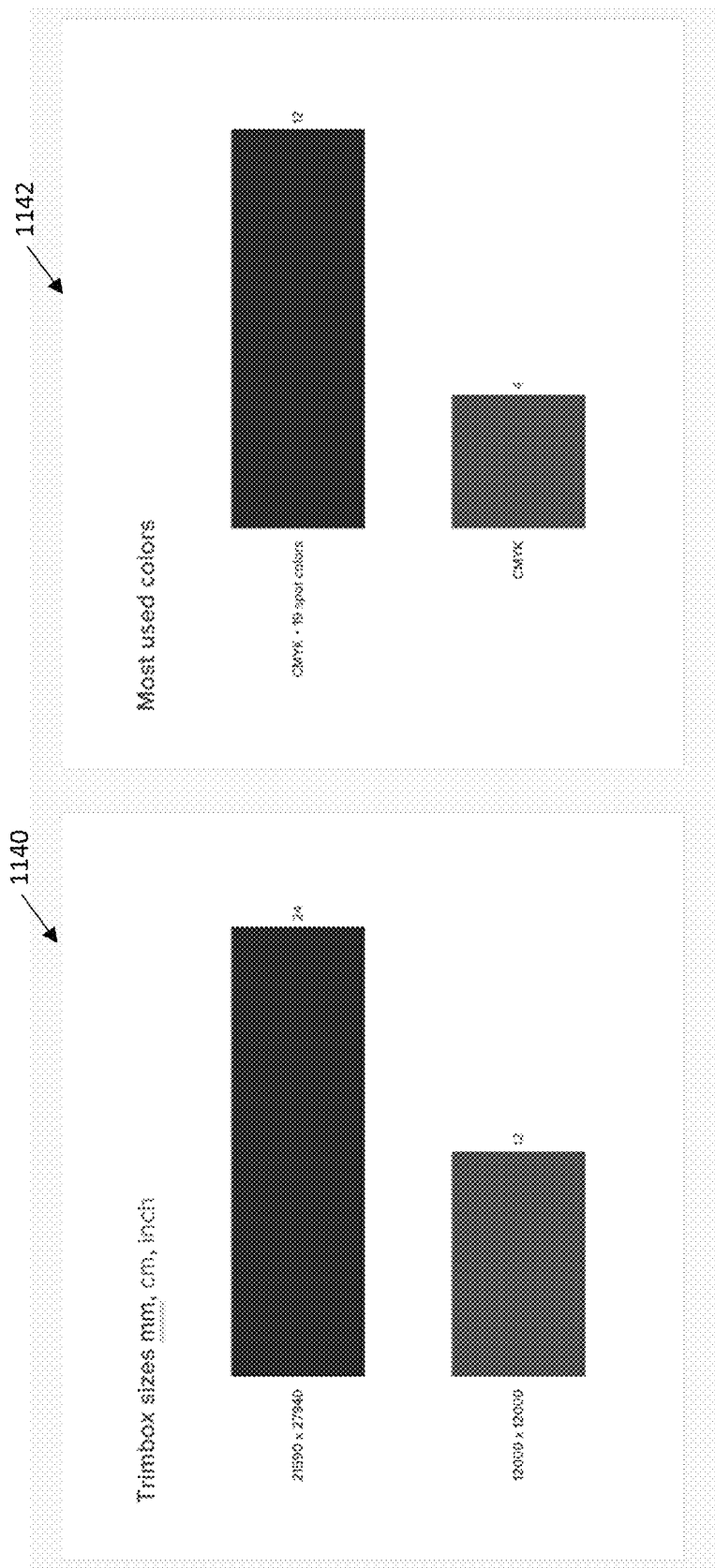
FIG. 11B depicts a second exemplary statistics dashboard screen or portion thereof.
Figure 12:
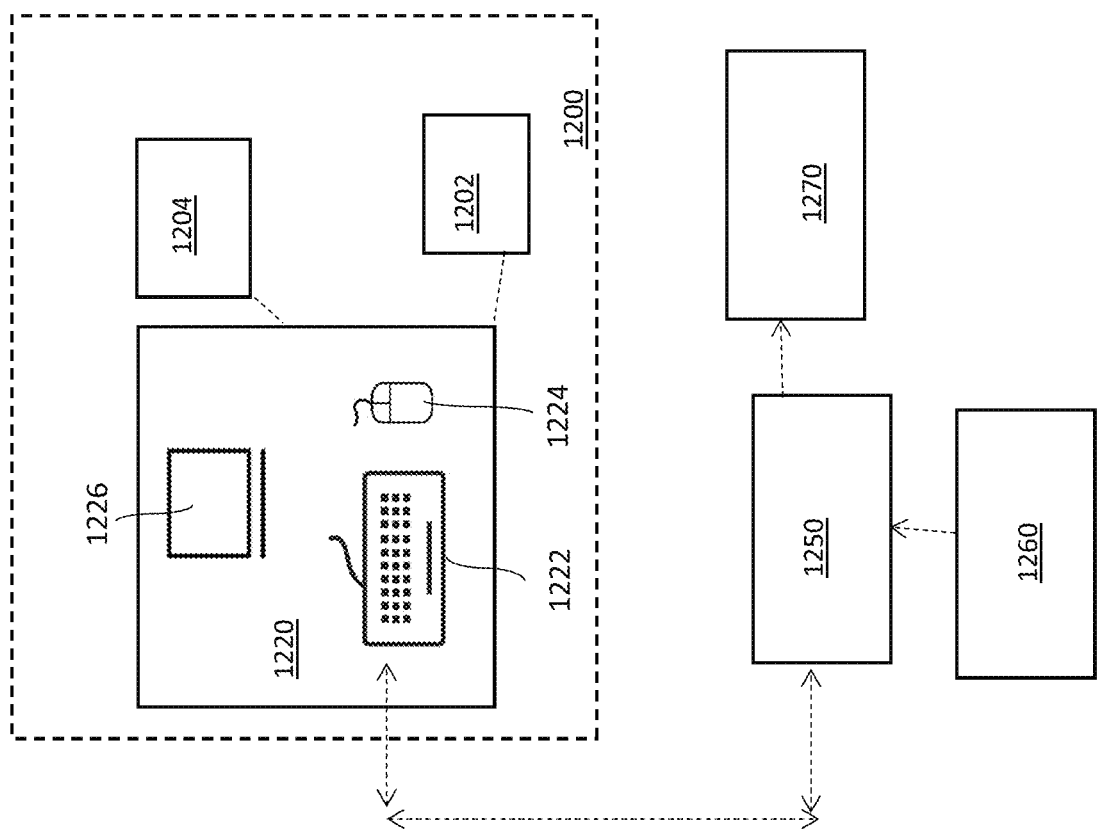
FIG. 12 schematically depicts an exemplary computer system for performing aspects of the invention as discussed herein.

The software tool may have one or more statistics dashboards 1100, such as the exemplary screens or portions thereof depicted in FIGS. 11A and 11B, which allow the user to visualize usage statistics relating to the software tool. Charts or text displayed in regions on this statistics dashboard may, for example, show the user, among others:

How many files were opened using the tool (total number depicted in region 1102; chart of files versus date opened depicted in region 1116);

How many errors were found (depicted in the chart shown in region 1118, including a breakdown by type of error);

How many files were eligible to be sent immediately to the prepress group (depicted in region 1104); and How many error reports were sent to customers (depicted in region 1106).

The information may be presented in charts and graphs. The user may be able to choose the period for which the numbers are displayed (e.g. yesterday, last week, last month, last year, a user-defined range, etc.), such as depicted in field 1120. The user may also be able to choose the identified instance of the software for which the run the statistics, by entering an identification number, as depicted in field 1130. Other types of statistics may be provided, such as for tracking trim box sizes evaluated, as depicted in region 1140, or for tracking colors, as depicted in region 1142. The statistics functionality, when provided in select embodiments, is not limited to any particular type of statistics tracked or depictions thereof.

The foregoing exemplary embodiment may be generally described as a computer implemented method for enabling review by a customer service representative (CSR) of a job including a digital graphics file intended for printing on a predetermined printing system. The method includes receiving an incoming electronic communication (e.g. an email) from a customer, the email containing job instructions in text (see, e.g., email text in box 500 in FIG. 5) and the digital graphics file as an attachment. The method includes providing a user interface (e.g. as depicted in FIG. 2) configured with job instruction presets (e.g. Offset 212; Digital 214, User-added presets created using "Add Preset" 216) to permit the CSR to select the job instruction presets corresponding to the job instructions. The computer processor performs a preflighting operation on the digital graphics file, based upon the job instruction presets and information about the predetermined printing system. The preflighting operation includes determining if the digital graphics file contains information required for printing the job with the selected job instruction presets on the predetermined printing system (e.g. contains embedded fonts), if the digital graphics file is within a predetermined resolution range, and if graphics embodied in the digital graphics file meet predetermined bleed criteria. The user interface provides a display screen having a first area (left sidebar 200), a second area (center region 240), a third area (right sidebar 250), and a fourth area (toolbar 210). Information about the file and annotations relating to results of the preflighting operation are displayed in the first area 200. A page of the job (e.g. 241a) is displayed in the second area 240. Selectable thumbnail images (e.g. 251a-d) of pages of the job are displayed in the third area 250. Selectable job instruction presets (e.g. 212, 214) are displayed in the fourth area (toolbar 210). User selection of a thumbnail (e.g. 251a) in the third area 250 causes the page displayed (e.g. 241a) in the second area 240 to correspond to the selected thumbnail in accordance with the selectable job instruction presets selected by the user in the fourth area 210. The method includes, if the preflighting operation contains rejection determinations, providing a prepopulated outgoing electronic communication (e.g. in box 600) addressed to the customer and containing information about the preflighting operation rejection determinations. If the preflighting operation contains no rejection determinations, the method includes saving the job instructions and the digital graphics file to computer memory, and providing an automatic notification to a prepress operation address indicating that the job is ready for further processing (e.g. using the functions as described within box 700).

It should be understood that the figures as shown herein depict only one of myriad embodiments for carrying out the functional aspects of the computer implemented method and systems as described herein, and that the invention is not limited to any particular embodiment. To the extent that the embodiment as illustrated depicts a number of ornamental features in the form of one or more of the icons shown herein as well as the arrangement and configuration of the user interface display screens, it should be understood that these ornamental features may be the subject of one or more design applications filed contemporaneously herewith. To the extent that such design applications may provide additional detail and context that informs the present application, they are incorporated herein by reference, including U.S. Design patent application Ser. No. 29/773,416, titled DISPLAY SCREEN WITH ICON GROUP, and Ser. No. 29/773,431, titled DISPLAY SCREEN WITH GRAPHICAL USER INTERFACE, filed the same day as the provisional application for which this application claims priority.

A computer system 1200 operable to perform aspects of the invention as described herein may comprise any computer equipped with a processor 1202 and operating system suitable for operating the software comprising the machine readable instructions for carrying out the functions as described herein. The instructions 1204 may be stored on any type of computer-readable media known in the art, including but not limited a hard drive, a flash drive, removable digital media, or on a server on a network (i.e. "in the cloud"). The computer system comprises one or more devices such as a keyboard 1222 and mouse 1224, operable by a user to provide user inputs, and a display 1226 (which may or may not be a touchscreen display capable of also receiving user inputs). The overall user interface 1220 includes a graphical user interface (GUI) displayed on the display 1226 in a form visually or functionally as depicted in FIGS. 1-11B. The computer system may be implemented on a single "desktop" machine, or the various components may be connected to one another over a computer network, including a local network or a global communications network in which, for example, files are stored or processing is performed "in the cloud." The software may be downloadable, non-downloadable, or a combination thereof, in which a "thin" portion resides on a user's local computer (which may include a tablet computer of other mobile device), and a more robust portion of the executable processing power resides on a server accessible via a computer network.

The computer system may include connections to one or more email servers 1250 for receiving incoming communications from senders 1260 (such as the email with attached file to be preflight checked, as discussed herein above) and to send outgoing communications to recipients 1270 (which may include the pre-press group or the customer, as described herein). It should be understood that a pre-press group in the same company as the CSR operating the software may share a singular email server (or group of servers), and that senders and recipients may be the same person or entity (or email servers or nodes corresponding thereto), in particular for incoming and outgoing emails to and from customers.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer implemented method for enabling a customer service representative (CSR) of a printer to review a print job submitted by a customer of the printer, the print job including a digital graphics file intended for printing on a predetermined printing system of the printer, the method comprising:
   a. receiving an incoming email from the customer containing job instructions in text of the email, and the digital graphics file as an attachment to the email;
   b. providing a user interface configured with one or more job instruction presets to permit the CSR to select at least one job instruction preset corresponding to the job instructions;
   c. performing, with a computer processor, a preflighting operation on the digital graphics file based upon the job instruction presets and information about the predetermined printing system, including determining if the digital graphics file contains information required for printing the job with the selected job instruction presets on the predetermined printing system, if the digital graphics file is within a predetermined resolution range, and if graphics embodied in the digital graphics file meet predetermined bleed criteria;
   d. providing a user interface comprising a display screen having a first area, a second area, a third area, and a fourth area, with the information about the graphics file and annotations relating to results of the preflighting operation displayed in the first area, a page of the print job displayed in the second area, selectable thumbnail images of pages of the print job displayed in the third area, and selectable job instruction presets displayed in the fourth area, wherein user selection of a thumbnail in the third area is operable to cause the page displayed in the second area to correspond to the selected thumbnail in accordance with the selectable job instruction presets selected by the user in the fourth area;
   e. if the preflighting operation contains rejection determinations, providing a prepopulated outgoing email addressed to the customer and containing information about the preflighting operation rejection determinations; and
   f. if the preflighting operation contains no rejection determinations, saving the job instructions and the digital graphics file to computer memory, and providing an automatic notification to a prepress operation address indicating that the job is ready for further processing.

2. The method of claim 1, wherein providing the user interface includes providing the first area as a sidebar located on a left side of a display screen, the third area as a sidebar located on a right side of the display screen, the second area as a center region located between the left sidebar and the right sidebar, and the fourth area as a toolbar positioned above the first, second, and third areas.

3. The method of claim 1, wherein the outgoing email comprises text with information corresponding to the annotations relating to results of the preflighting operation.

4. The method of claim 3, wherein preparing the email comprises the processor providing automatically prepopulated text that is user-editable.

5. The method of claim 4, including providing the user with user-selectable options to save the prepopulated text to a clipboard, or create an email using a preselected email option.

6. The method of claim 3, wherein the text of the outgoing email appears in a fifth area of the user interface.

7. The method of claim 6, wherein the fifth area is a pop-up box.

8. The method of claim 7, wherein the fifth area pop-up box is positioned on a left side of the second area.

9. The method of claim 1, further comprising providing a user-selectable option to save the job file and a user-selectable option to prepare an electronic notification to a prepress group comprising text.

10. The method of claim 9, wherein preparing the electronic notification comprises the processor providing automatically prepopulated text that is user-editable.

11. The method of claim 10, including providing the user with user-selectable options to save the electronic notification to a clipboard, or to create an email to the prepress group using a preselected email option.

12. The method of claim 9, wherein the text of the electronic notification appears in a sixth area of the user interface.

13. The method of claim 12, wherein the sixth area is a pop-up box.

14. The method of claim 13, wherein the sixth area pop-up box is positioned on a right side of the second area.

15. The method of claim 1, including providing the user with a user-selectable option to add a preset.

16. The method of claim 1, wherein each preset includes user-definable criteria including minimum image resolution and bleed requirements, including minimum bleed size.

17. The method of claim 1, further comprising one or more areas of the user interface comprising visual displays of usage statistics relating to the software tool.

18. A system for enabling a customer service representative (CSR) to review a print job including a digital graphics file intended for printing on a predetermined printing system, the system comprising a computer processor and a non-transitory computer memory medium accessible by the computer processor, the computer memory medium having stored thereon machine-readable instructions for causing the computer processor to perform the steps of:
  a. receiving an incoming email from a customer containing job instructions in text, and the digital graphics file as an attachment;
  b. providing a user interface configured with one or more job instruction presets to permit the CSR to select at least one job instruction preset corresponding to the job instructions;
  c. performing, with a computer processor, a preflighting operation on the digital graphics file based upon the job instruction presets and information about the predetermined printing system, including determining if the digital graphics file contains information required for printing the job with the selected job instruction presets on the predetermined printing system, if the digital graphics file is within a predetermined resolution range, and if graphics embodied in the digital graphics file meet predetermined bleed criteria;
  d. providing a user interface comprising a display screen having a first area, a second area, a third area, and a fourth area, with the information about the graphics file and annotations relating to results of the preflighting operation, a page of the job displayed in the second area, selectable thumbnail images of pages of the job in the third area, and selectable job instruction presets in the fourth area, wherein user selection of a thumbnail in the third area causes the page displayed in the second area to correspond to the selected thumbnail in accordance with the selectable job instruction presets selected by the user in the fourth area;
  e. if the preflighting operation contains rejection determinations, providing a prepopulated outgoing email addressed to the customer and containing information about the preflighting operation rejection determinations; and
  f. if the preflighting operation contains no rejection determinations, saving the job instructions and the digital graphics file to computer memory, and providing an automatic notification to a prepress operation address indicating that the job is ready for further processing.

19. A non-transitory computer memory medium having stored thereon machine-readable software instructions that, when executed by a processor, cause the processor to perform the steps of:
  a. receiving an incoming email from a customer containing job instructions in text, and a digital graphics file as an attachment;
  b. providing a user interface configured with one or more job instruction presets to permit a customer service representative (CSR) to select at least one job instruction preset corresponding to the job instructions;
  c. performing, with a computer processor, a preflighting operation on the digital graphics file based upon the job instruction presets and information about the predetermined printing system, including determining if the digital graphics file contains information required for printing the job with the selected job instruction presets on the predetermined printing system, if the digital graphics file is within a predetermined resolution range, and if graphics embodied in the digital graphics file meet predetermined bleed criteria;
  d. providing a user interface comprising a display screen having a first area, a second area, a third area, and a fourth area, with the information about the graphics file and annotations relating to results of the preflighting operation, a page of the print job displayed in the second area, selectable thumbnail images of pages of the print job in the third area, and selectable job instruction presets in the fourth area, wherein user selection of a thumbnail in the third area causes the page displayed in the second area to correspond to the selected thumbnail in accordance with the selectable job instruction presets selected by the user in the fourth area;
  e. if the preflighting operation contains rejection determinations, providing a prepopulated outgoing email addressed to the customer and containing information about the preflighting operation rejection determinations; and
  f. if the preflighting operation contains no rejection determinations, saving the job instructions and the digital graphics file to computer memory, and providing an automatic notification to a prepress operation address indicating that the job is ready for further processing.

\* \* \* \* \*